(12) United States Patent
White

(10) Patent No.: US 9,797,802 B2
(45) Date of Patent: Oct. 24, 2017

(54) VIRTUAL TESTING MODEL FOR USE IN SIMULATED AERODYNAMIC TESTING

(71) Applicant: Jay White, Portland, OR (US)

(72) Inventor: Jay White, Portland, OR (US)

( * ) Notice: Subject to any disclaimer, the term of this patent is extended or adjusted under 35 U.S.C. 154(b) by 776 days.

(21) Appl. No.: 14/197,119

(22) Filed: Mar. 4, 2014

(65) Prior Publication Data
US 2014/0249789 A1 Sep. 4, 2014

Related U.S. Application Data

(60) Provisional application No. 61/772,464, filed on Mar. 4, 2013.

(51) Int. Cl.
  *G06G 7/48* (2006.01)
  *G01M 9/08* (2006.01)
(52) U.S. Cl.
  CPC .................................... *G01M 9/08* (2013.01)
(58) Field of Classification Search
  CPC ........................................................ G01M 9/08
  USPC ................................................................. 703/6
  See application file for complete search history.

(56) References Cited

U.S. PATENT DOCUMENTS

| | | | |
|---|---|---|---|
| 5,123,169 A | 6/1992 | White et al. | |
| 5,128,880 A | 7/1992 | White | |
| 5,195,030 A | 3/1993 | White | |
| 5,231,723 A | 8/1993 | White et al. | |
| 5,237,520 A | 8/1993 | White | |
| 5,495,568 A | 2/1996 | Beavin | |
| 5,850,222 A | 12/1998 | Cone | |
| 5,956,525 A | 9/1999 | Minsky | |
| 6,101,424 A | 8/2000 | Sawada | |
| 6,307,568 B1 | 10/2001 | Rom | |
| 6,701,207 B1 | 3/2004 | Gazzuolo | |
| 6,711,455 B1 | 3/2004 | Holloway et al. | |
| 7,373,284 B2 | 5/2008 | Stabelfeldt et al. | |
| 8,428,357 B2 | 4/2013 | Stephenson | |
| 2008/0180448 A1* | 7/2008 | Anguelov | G06T 17/00 345/475 |
| 2011/0142354 A1* | 6/2011 | Sung | G06T 7/73 382/209 |

OTHER PUBLICATIONS

Thiji Defraeye, Bert Blocken, Erwin Koninckx, Perter Hespel, Jan Carmeliet, "Aerodynamic study of different cyclist positions; CFD analysis and full-scale wind-tunnel tests" Journal of Biomechanics, 2010, pp. 1262-1268.*

(Continued)

*Primary Examiner* — Dwin M Craig
(74) *Attorney, Agent, or Firm* — Klarquist Sparkman, LLP

(57) ABSTRACT

A method for developing a virtual testing model of a subject for use in simulated aerodynamic testing comprises providing a computer generated generic 3D mesh of the subject, identifying a dimension of the subject and at least one reference point on the subject, imaging the subject to develop point cloud data representing at least the subject's outer surface and adapting the generic 3D mesh to the subject. The generic 3D mesh is adapted by modifying it to have a corresponding dimension and at least one corresponding reference point, and applying at least a portion of the point cloud data from the imaged subject's outer surface at selected locations to scale the generic 3D mesh to correspond to the subject, thereby developing the virtual testing model specific to the subject.

18 Claims, 17 Drawing Sheets

(56) References Cited

OTHER PUBLICATIONS

3ds Max, "Mapping Motion from Motion-Capture Point Clouds," http://docs.autodesk.com/3DSMAX/15/ENU/3ds-Max-Help/index.html?url=files/GUID-76C64B03-FEC7-4C3C-89D4-8E693CDD86F5.htm.topicNumber=d30e287137 (printed Mar. 4, 2014).

Allen, B. et al., "The space of human body shapes: reconstruction and parameterization from range scans," *ACM Siggraph* 2003, 8 pages (Jul. 2003).

Blocken, E. et al., "CFD simulations of the aerodynamic drag of two drafting cyclists," *Computers & Fluids*, 17 pages (accepted for publication on Nov. 21, 2012).

Capvidia, "Aerodynamics of complex moving 3D objects," http://www.capvidia.com/capvidia-in-the-press/285-aerodynamics-of-complex-moving-3d-objects (printed Feb. 28, 2014).

Chowdhury, A., "Aerodynamics of Sports Fabrics and Garments," *Theses and Dissertations*. (Mar. 2012).

Doval, P. N., "Aerodynamic Analysis and Drag Coefficient Evaluation of Time-Trial Bicycle Riders," *Theses and Dissertations*. Paper 28 (Dec. 2012).

Geomagic, "Reverse engineering and CFD help British Cycling Team sprint to Olympic medals," http://www.geomagic.com/en/community/case-studies/reverse-engineering-and-cfd-help-british-cycling-team-sprint-to-/ (printed Feb. 27, 2014).

Gilbertson, M., "Measuring cycling kinematics using a low-cost, flashing LED, multi-camera approach," *Theses and Dissertations*. (Jun. 2008).

Leuprecht, A., "Combined CFD and MRI study of blood flow in a human ascending aorta model," *Biorheology*, vol. 39, pp. 425-429 (Feb. 2002).

Silvester, S., "Dress for Success," *Ansys Advantage*, vol. IV, Issue 2, pp. 10-14 (2012).

* cited by examiner

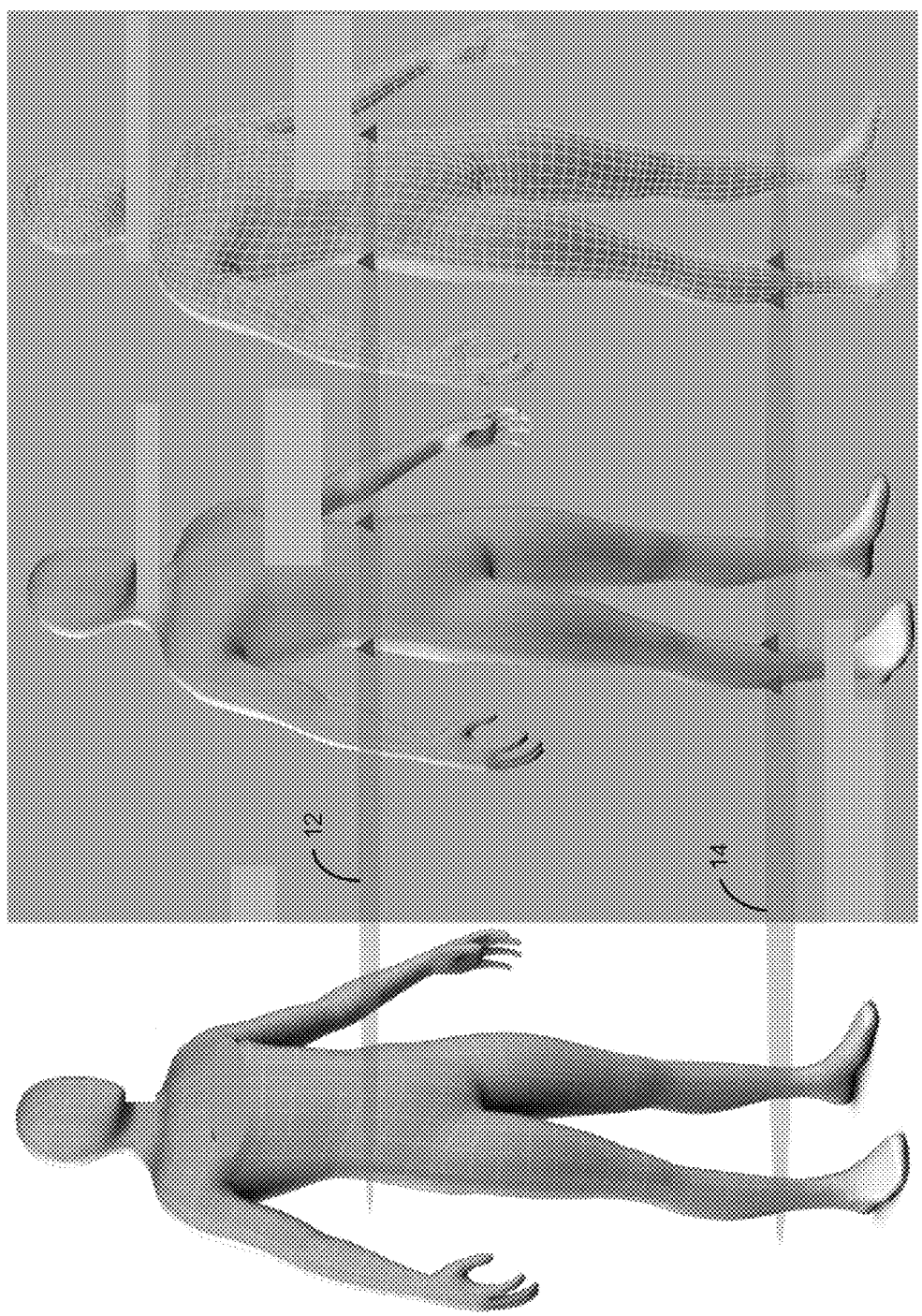

VIRTUAL TESTING MODEL FOR USE IN SIMULATED AERODYNAMIC TESTING

CROSS-REFERENCE TO RELATED APPLICATION

This application claims the benefit of U.S. Provisional Patent Application No. 61/772,464 filed on Mar. 4, 2013, which is incorporated herein by reference.

BACKGROUND

Aerodynamic testing is important for athletes, particularly in sports where results are decided by fractions of a second, such as in cycling, skiing, ski jumping, skating and bobsledding, as just a few examples.

Conventionally, aerodynamic testing has included sessions in a wind tunnel facility to generate conditions that are as close to real-world conditions as possible. In this way, athletes can evaluate different factors, including body positions and clothing and equipment choices, to determine which configuration should produce less aerodynamic drag, and thus be faster on the race course.

Wind-tunnel testing opportunities for athletes, however, are limited because wind tunnel testing time is very expensive. Moreover, it is difficult to make changes to a configuration and then meaningfully evaluate the changes in real-time during a single tunnel testing session.

SUMMARY

Described below are systems and methods that address drawbacks of conventional technology used for aerodynamic testing. These systems and methods are particularly suited to testing athletes and their clothing and equipment, but the same principles can be applied to other areas.

According to one implementation, a method for developing a virtual testing model of a subject for use in simulated aerodynamic testing includes providing a computer generated generic 3D mesh of the subject, identifying a dimension of the subject and at least one reference point on the subject, imaging the subject to develop point cloud data representing at least the subject's outer surface and adapting the generic 3D mesh to the subject by modifying it to have a corresponding dimension and at least one corresponding reference point. The corresponding dimension corresponds to the identified dimension of the subject and corresponding reference point corresponds to the identified at least one reference point of the subject. The generic 3D mesh is modified further by applying at least a portion of the point cloud data from the imaged subject's outer surface at selected locations to scale the generic 3D mesh to correspond to the subject, thereby developing the virtual testing model specific to the subject.

Providing a computer generated generic 3D mesh of the subject can include subjecting the subject to a motion capture process, and the act of imaging the subject to develop point cloud data can occur concurrent with the motion capture process.

Imaging the subject can include using at least one of laser scanning, stereo vision, and optical high resolution 3D scanning techniques.

In one implementation, the subject is a human subject, the dimension of the subject is the human subject's height, and the at least one reference point is taken from a set of reference points establishing the human subject's limb lengths and elbow, knee and ankle positions.

In one implementation, as an example, modifying the 3D mesh further includes scaling the generic 3D mesh of the human subject to correspond to the human subject's actual lower leg circumference by applying point cloud data representing the lower leg circumference, the point cloud data having a common datum with the generic 3D mesh.

In some implementations, modifying the generic 3D mesh further by applying point cloud data occurs substantially in real time. In some implementations, developing the virtual testing model specific to the subject occurs without filling holes and without resolving discontinuities present in the point cloud data representing the subject's outer surface.

In some implementations, the subject is a human subject, the human subject is recorded during a motion capture session emulating an activity, and wherein, concurrent with the motion capture session, the imaging of the subject is completed, thereby allowing the adapting of the generic 3D mesh to be completed substantially in real time to develop the virtual testing model of the human subject in motion.

In some implementations, the approach further comprises animating the virtual testing model based on motion capture data of the subject in motion and subjecting the animated virtual testing model to simulated aerodynamic testing. In some implementations, the approach comprises supplementing the animated virtual testing model of the human subject with an accessory submodel representing at least one of an article of clothing worn by the human subject or an item of equipment used by the human subject. As just some examples, the accessory submodel can comprise a submodel for a garment wearable by the human subject, a helmet wearable by the human subject and/or a bicycle to be ridden by the human subject.

In some implementations, the animated virtual testing model is displayed, and the approach includes dynamically evaluating changes to the human subject based on changes to the displayed animated virtual testing model.

In some implementations, the subject is a human subject, the human subject is recorded during a motion capture session, and, concurrent with the motion capture session, the human subject is imaged. Further, the generic mesh is adapted by correlating thin segments of point cloud data along a desired axis to corresponding locations in the generic mesh and applying valid point cloud data from the segments to selectively resize the generic mesh to more closely match the human subject, and, if no valid point cloud data exists for a specific segment, then dimensions of the generic mesh at a location corresponding the specific segment are retained.

In another implementation, a method for developing a virtual testing model of a human subject in motion for use in simulated aerodynamic testing comprises recording the human subject in motion in a motion capture session using a generic 3D mesh of the human subject. Concurrent with the motion capture session, at least a portion of the human subject is imaged by developing point cloud data of the human subject. Substantially in real time, the generic 3D mesh is adapted to match the subject more closely at locations where valid point cloud data is present by modifying the generic 3D mesh at corresponding locations to have dimensions matching the point cloud data.

Associated computer program products that implement all or parts of the above methods are also described.

According to another implementation, a method of simulating aerodynamic testing, comprises providing a computer-generated model of a human subject suitable for computational fluid dynamics analysis, providing a stereo image of the human subject, and mapping the computer-generated model and the stereo image together to develop a drag weight per pixel of the image. The drag weight for each individual pixel of the stereo image can be summed to determine an overall drag weight. A change in drag weight can be calculated from evaluating a change in the stereo image.

According to another implementation, first and second drag weights at respective first and second yaw angles are established by computational fluid dynamics calculations; and intermediate yaw angles between first and second yaw angles are determined by interpolating between the first and second weights and using the calculated drag weight per pixel to determine corresponding drag weights.

These and other implementations are more fully described below in connection with the following drawings.

BRIEF DESCRIPTION OF DRAWINGS

FIG. 1 is a portion of a screen shot from a software application running on a computer that shows a representation of a human subject with a generic 3D mesh.

FIG. 2 is a representation of the FIG. 1 subject, such as might be shown in a screen shot, in the process of undergoing a high resolution image scan to develop a point cloud data representation of his outer surface.

FIG. 3 is a representation of the subject from FIG. 1 and FIG. 2 as developed into a virtual testing model of the human subject.

DETAILED DESCRIPTION

Figure 4:
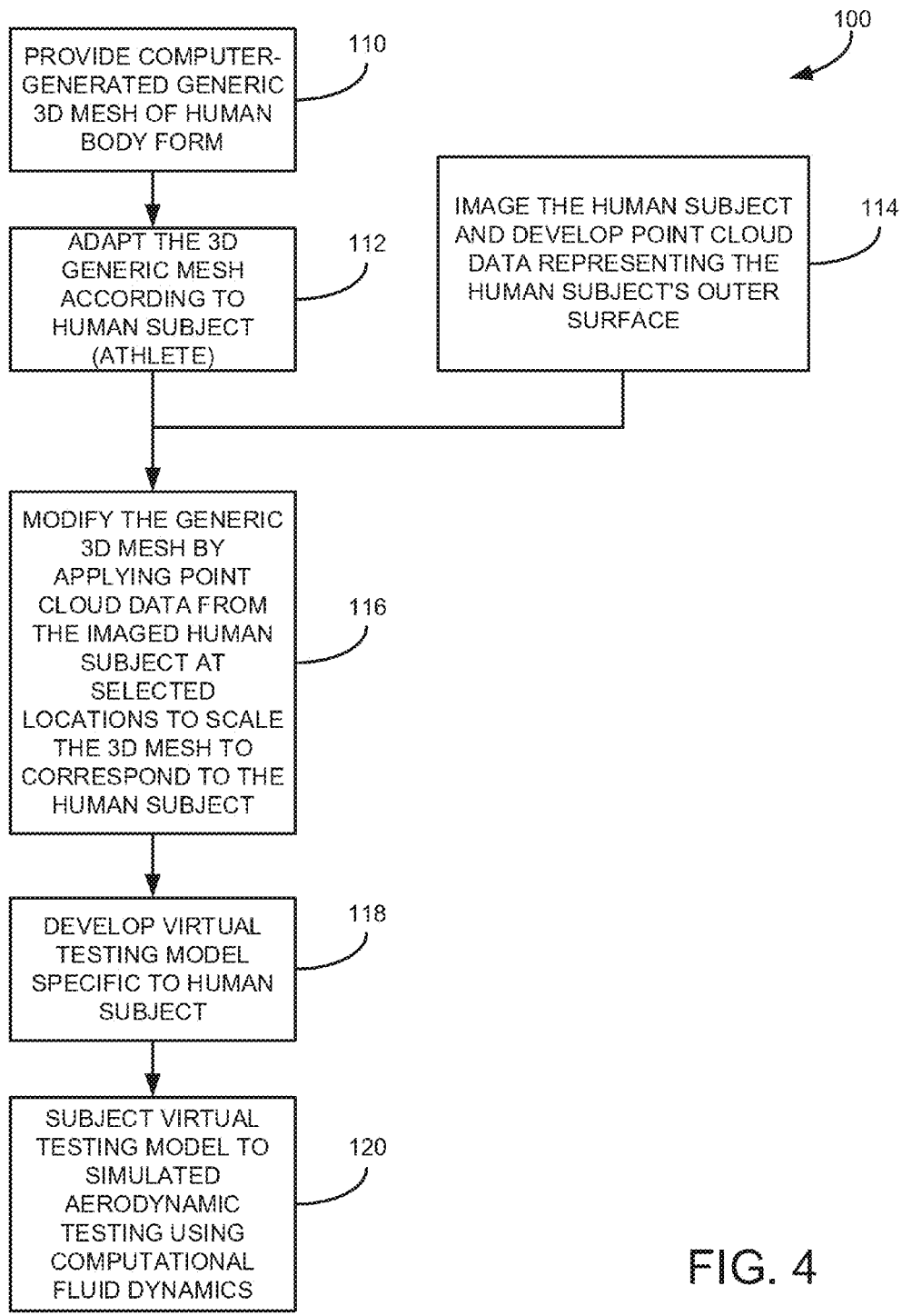
FIG. 4 is a flow chart of a method for developing a virtual testing model as described in connection with FIGS. 1-3.

With reference to the flow chart of FIG. 4 and FIGS. 1, 2 and 3, a representative method 100 and corresponding systems for developing a virtual testing model of a human subject (also sometimes referred to herein as the athlete) for use in aerodynamic testing can be described.

In step 110, a computer-generated 3D mesh of a human body form is provided. In the example of FIG. 1, which is taken from a computer software modelling environment, a generic 3D polygon mesh in human body form is depicted standing erect with arms slightly outstretched.

In step 112, the generic 3D mesh (also sometimes referred to herein as the avatar) is adapted to the human subject. Because the mesh is generic, it must be sized or fitted to the actual subject. Thus, the generic 3D mesh is modified to have the actual height and at least one other body reference point of the human subject.

According to one approach, a T Pose program is used, and the generic mesh is modified to have the human subject's height, limb lengths, elbow, knee and ankle positions. It would be possible, of course, to use fewer or more body reference points. The key is use an appropriate number to allow an accurate intermediate representation to be made. Alternatively, as is described below in greater detail, the subject's height and one or more reference points can be obtained from a motion capture phase.

In step 114, the human subject is imaged, and point cloud data representing the human subject's outer surface is developed. FIG. 2 shows a representative point cloud data model from an image scan of the human subject's outer surface while in a position corresponding to the 3D mesh of FIG. 1.

In step 116, the generic 3D mesh from step 112 is further modified by applying point cloud data from step 114. Specifically, point cloud data from the imaged human subject's outer surface at selected locations is applied to scale the generic 3D mesh at corresponding locations. In this way, a virtual testing model specific to the human subject is developed (step 118).

With reference to FIGS. 1-3, point cloud data for selected locations (see examples shown at the horizontal bands 12, 14 at mid-torso and lower leg levels) from FIG. 2 is applied to the generic 3D mesh of FIG. 1 to develop the virtual testing model shown schematically in FIG. 3. Using the lower right leg as one illustrative example, it can be assumed that the locations of the human subject's knees and ankles are specified in the generic 3D mesh of FIG. 1, but the cross-sectional size of the human subject's lower right leg is not known, so the generic 3D mesh uses a generic dimension at the indicated elevation. The point cloud data for the human subject's lower right leg at the same elevation can be applied to make the generic 3D mesh specific to the human subject at that elevation. These steps can be carried out in a continuous fashion over the height of the human subject to "fill in" missing data, including at levels above, below and between the finite body reference points of the generic 3D mesh.

In specific implementations, adapting the generic 3D mesh to the human subject and the imaging of the human subject take place concurrently. The imaging can be completed using laser scanning, stereo vision, optical high resolution 3D scanning or other similar techniques. In the illustrated example, the approach leverages the fact that the subject is standing erect and thus the ground is a common datum for modifying the generic 3D mesh and for imaging the human subject.

It should be noted that although the human subject is scanned to develop point cloud data representing the human subject's outer surface, such data is incomplete and will have discontinuities. For example, there are typically "holes" in the data at the locations of the human subject's eyes, mouth and crotch, to name a few examples. To use the imaged human subject's outer surface in computational fluid dynamics (CFD), these and other holes in the data and discontinuities would first need to be resolved. Conventionally, this requires hours of a skilled user's time to "shape" the data and "fill" the holes. A resulting complete surface scan may have on the order of 500,000 data points, in contrast to the approach taken here where the virtual testing model may have on the order of 10,000 data points, i.e., well less than 10% and even as few as 2% as the complete surface scan.

In addition, modifying the generic 3D mesh by applying point cloud data to develop the virtual testing model occurs substantially in real-time. In contrast to conventional approaches that may require hours of processing time, the described approaches are completed in minutes, if not in seconds, for most typical test subjects. As a result, the described approaches allow the virtual testing model to be developed (step 118) and subjected to simulated aerodynamic testing using computational fluid dynamics (step 120) substantially in real time, i.e., in a stepwise fashion without lengthy delays or idle times for data processing.

In some implementations, the human subject is in motion, such as emulating a selected activity, while the human subject is being imaged. For example, the human subject can be riding a bicycle set to be stationary but allowing the subject to turn the pedals and cause at least the rear wheel to rotate. Imaging data of the human subject in motion can be used to animate the generic 3D mesh of the human subject, thus allowing dynamic modeling of the human subject in motion.

Figure 5:
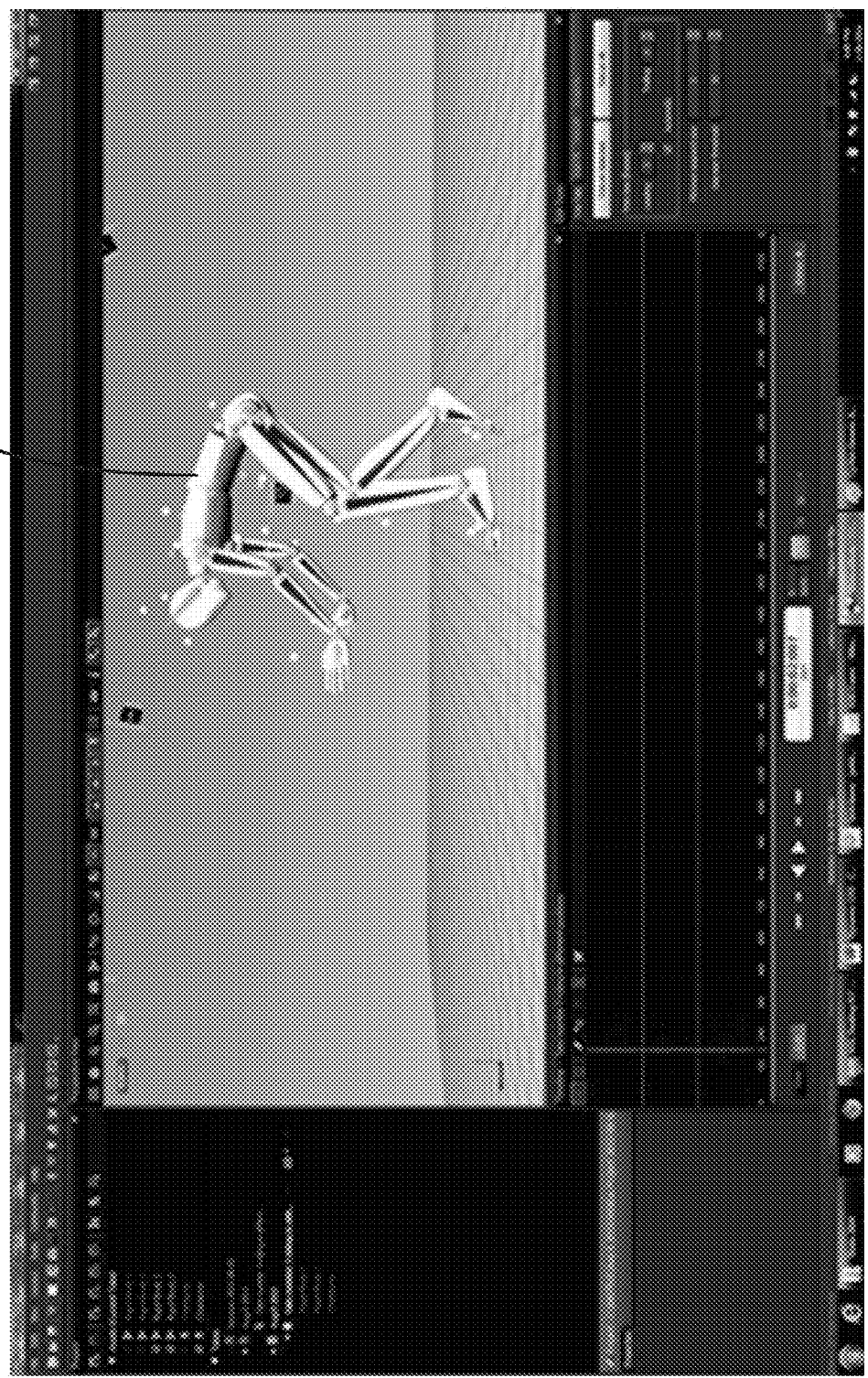
FIG. 5 is a screen shot showing a generic 3D mesh of a human subject in a motion capture modelling environment.
Figure 18:
FIG. 18 is a side elevation view showing a human subject riding a bicycle supported in a stationary position to allow dynamics of moving legs, wheels and bicycle drivetrain to be modelled.

FIGS. 5-11 illustrate an implementation of the above method as applied to a human subject or athlete being modelled in his position for riding a bicycle. In FIG. 5, a screen capture or screen shot of a generic 3D mesh 200 of a human subject is shown in a main portion of the screen. As can be seen, the generic 3D mesh 200 is shown with suggestive skeletal elements and data points. In the implementation of FIG. 5, the data points have been developed from a motion capture session in which a human subject is riding a bicycle while the subject's motion is captured with one or more motion capture cameras. One suitable motion capture system for recording the human subject is the OptiTrack Motive software available from NaturalPoint, Inc. and suitable cameras. FIG. 18 shows an example of a human subject riding a bicycle that is secured to a device to hold it stationary.

Figure 6:
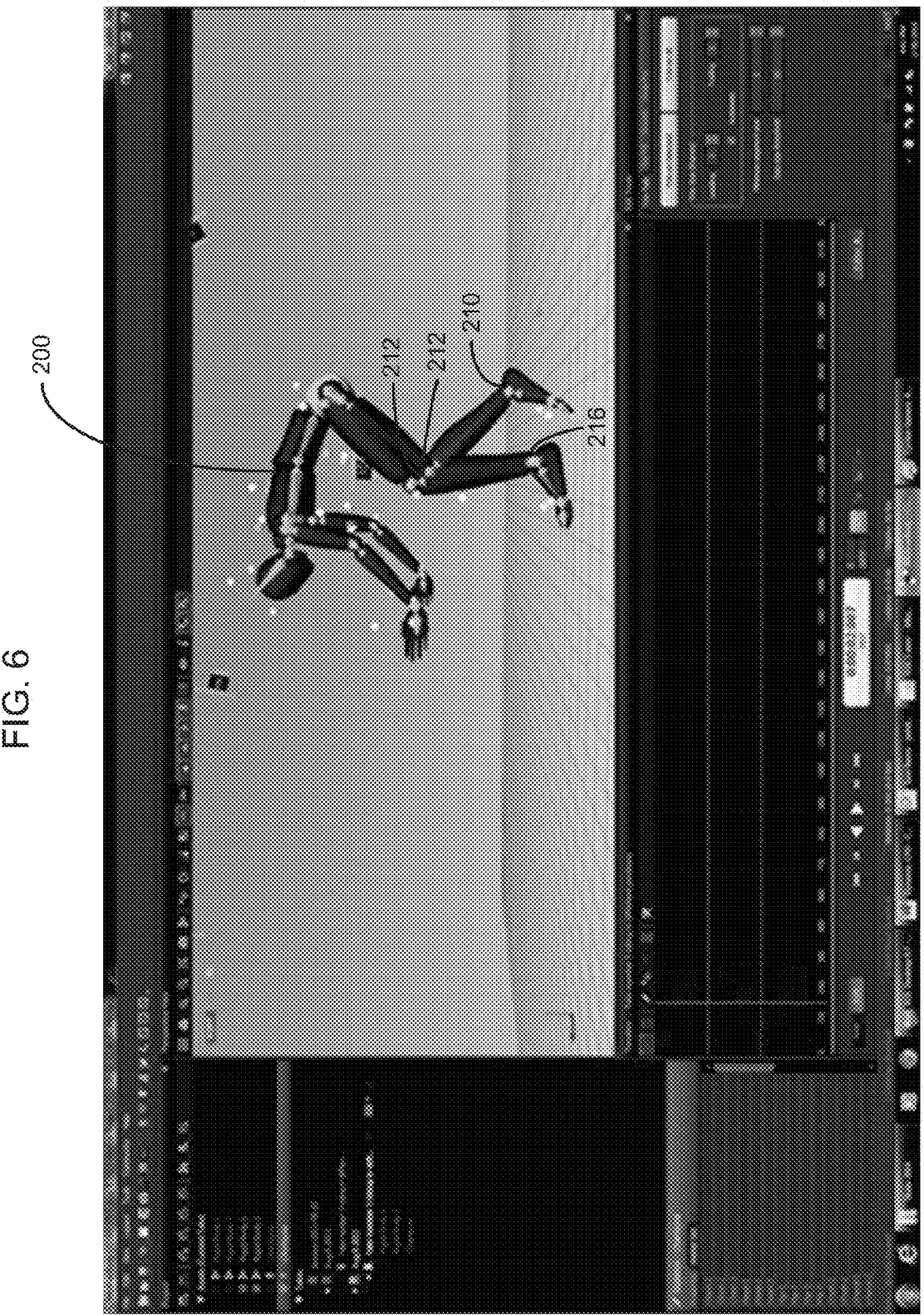
FIG. 6 is a screen shot taken from the same modelling environment as FIG. 5 but showing the generic 3D mesh of the human subject turned off to show the points of the subject's body found during the modelling process.
Figure 7:
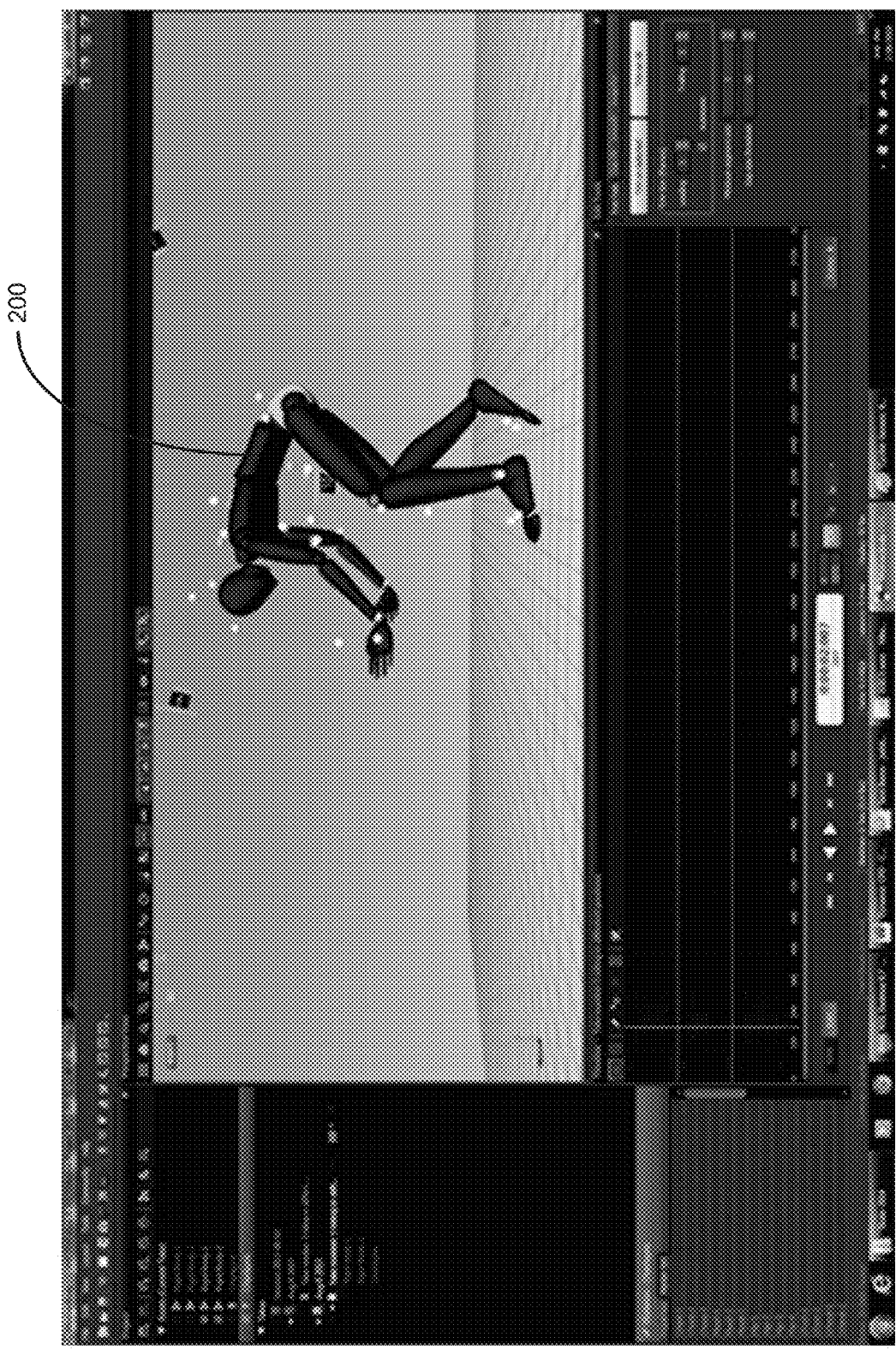
FIG. 7 is a screen shot taken from the same modelling environment as FIGS. 5 and 6 but showing a solid surface form of the generic 3D mesh.

In FIG. 6, the skeletal elements overlay has been turned off, which reveals more of the data points corresponding to joint locations on the human subject. As just two examples, the human subject's ankles are shown at 210, and his knees are shown at 212. The positions of the ankles 210 and knees 212 are established according to well-known motion capture principles involving the use of high speed filming (such as at 120 frames per second or faster). Motion capture techniques using markers placed on the human subject's body or so-called markerless tracking techniques can be used. In FIG. 7, the generic 3D mesh is shown having a more solid form, and can be shown in motion corresponding to the motion being captured.

Figure 8:
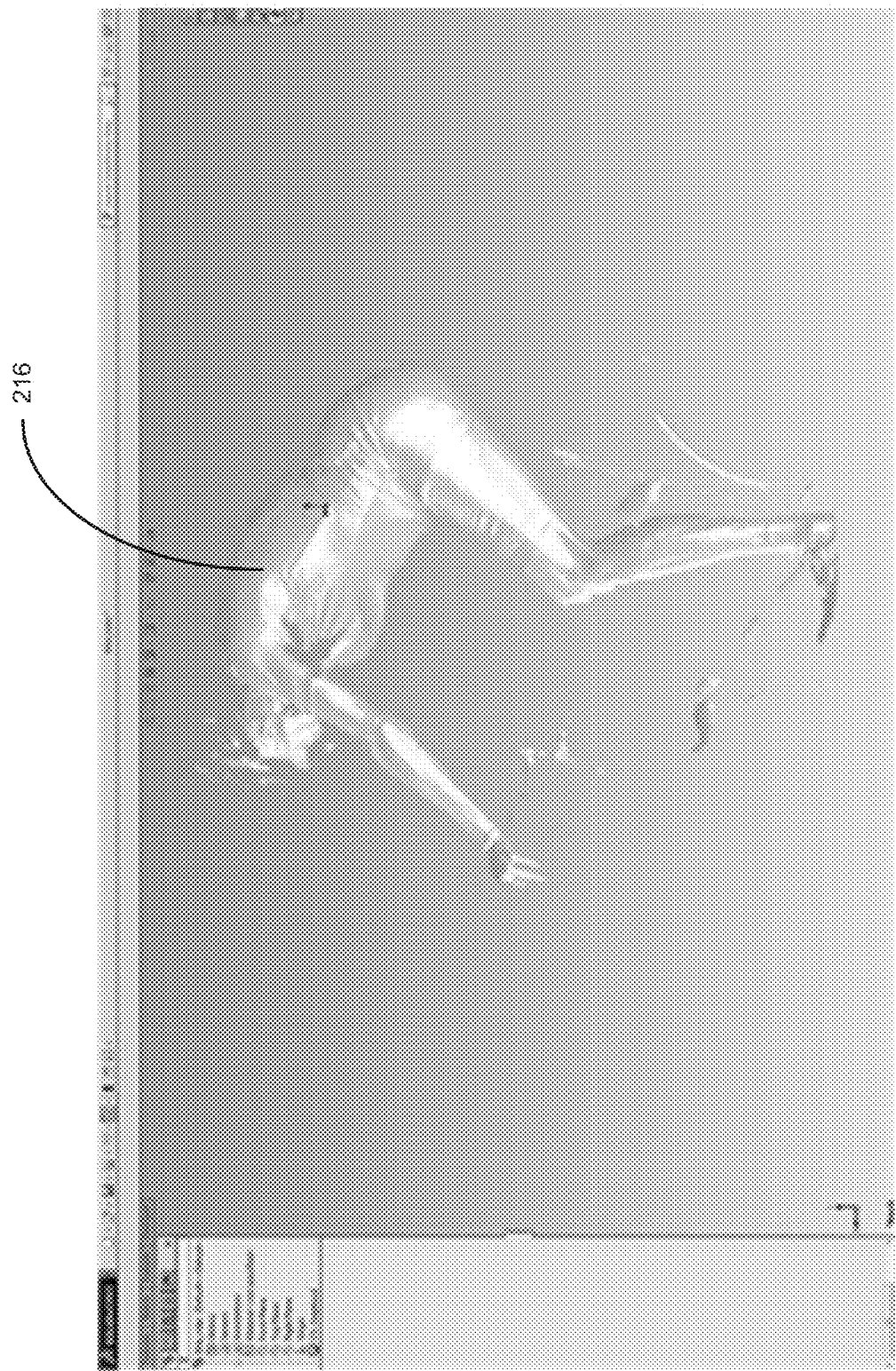
FIG. 8 is a screen shot from an image scanning application showing a scanned point cloud image of the human subject of FIGS. 5-7.

FIG. 8 is a screen shot from a solid modelling application displaying a scanned point cloud image 216 of a side elevation of the human subject of FIGS. 5-7, i.e., as positioned while riding a bicycle. As can be seen, there are holes and discontinuities in the point cloud data, such as in the area of the human subject's arm pit. One suitable image scanning system for obtaining the point cloud data of the human subject is one or more Arctec Eva scanners. The solid modelling application used to display and manipulate the scanned point cloud image 216 in FIG. 8 is SolidWorks 3D CAD, but any other similar modelling program could also be used.

Figure 9:
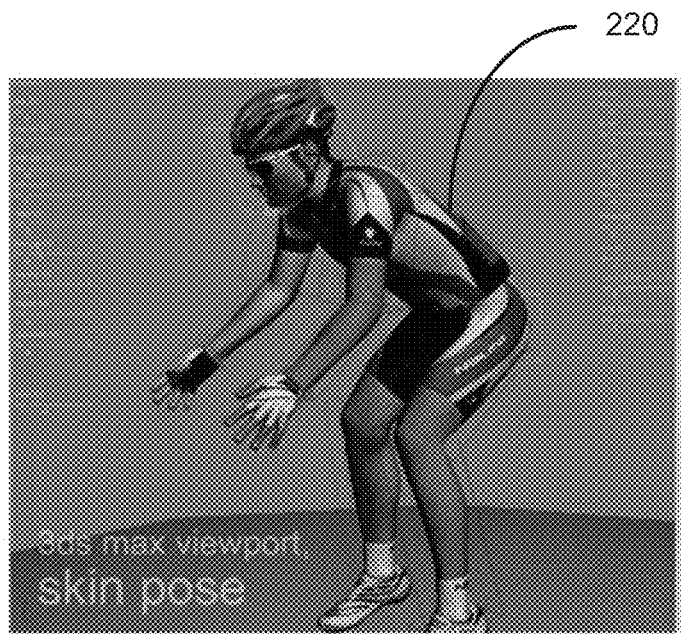
FIG. 9 is a screen shot taken from a 3D modelling and animation application showing a completed virtual testing model of the human subject as developed from FIGS. 5-8.
Figure 10:
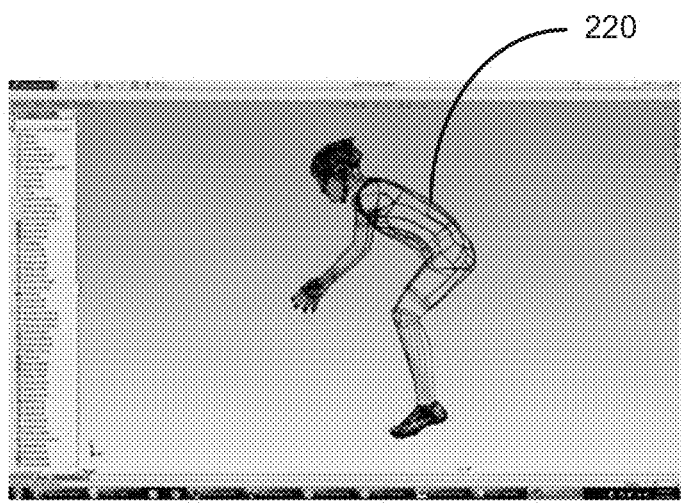
FIG. 10 is a screen shot taken from a modeling program that illustrates the underlying surface of the model of FIG. 9.

FIG. 9 is a screen shot showing a virtual model 220 of the human subject developed from FIGS. 5-7 (now shown as clothed for cycling) after having been adapted based on the point cloud data of FIG. 8. Specifically, segments from the point cloud data, where present and valid, have been used to resize the generic 3D mesh according to the human subject's actual dimensions. FIG. 10 is another view of the virtual model 220 of the human subject, which is shown in a transparent format to reveal the completeness of the model.

Figure 11:
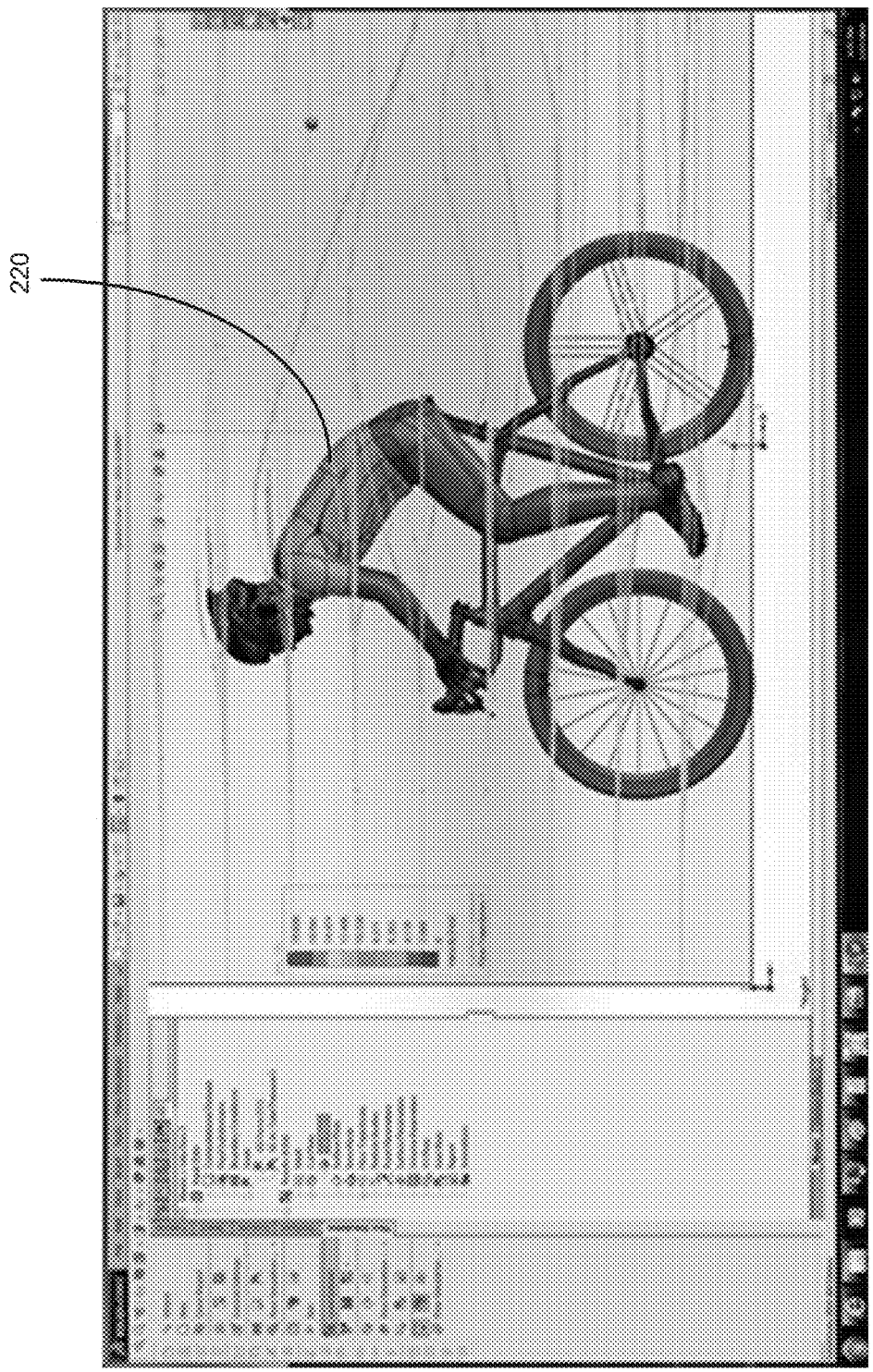
FIG. 11 is a screen shot from a modeling program showing the virtual testing model developed from FIGS. 5-8 being subjected to simulated aerodynamic testing with computational fluid dynamics

FIG. 11 is a screen shot showing the virtual model 220 of the human subject in position on a bicycle and being subjected to simulated aerodynamic testing using computational fluid dynamics As shown, the flow lines and aerodynamic forces can be shown in relation to the human subject and the bicycle to convey a realistic illustration of the physical environment and improve comprehension. Suitable software environments for displaying and manipulating models with CFD include SolidWorks Flow and ANSYS Fluent. The virtual model 220 is a more accurate representation and provides faster and more meaningful results in a more cost-effective manner than conventional approaches.

Figure 12:
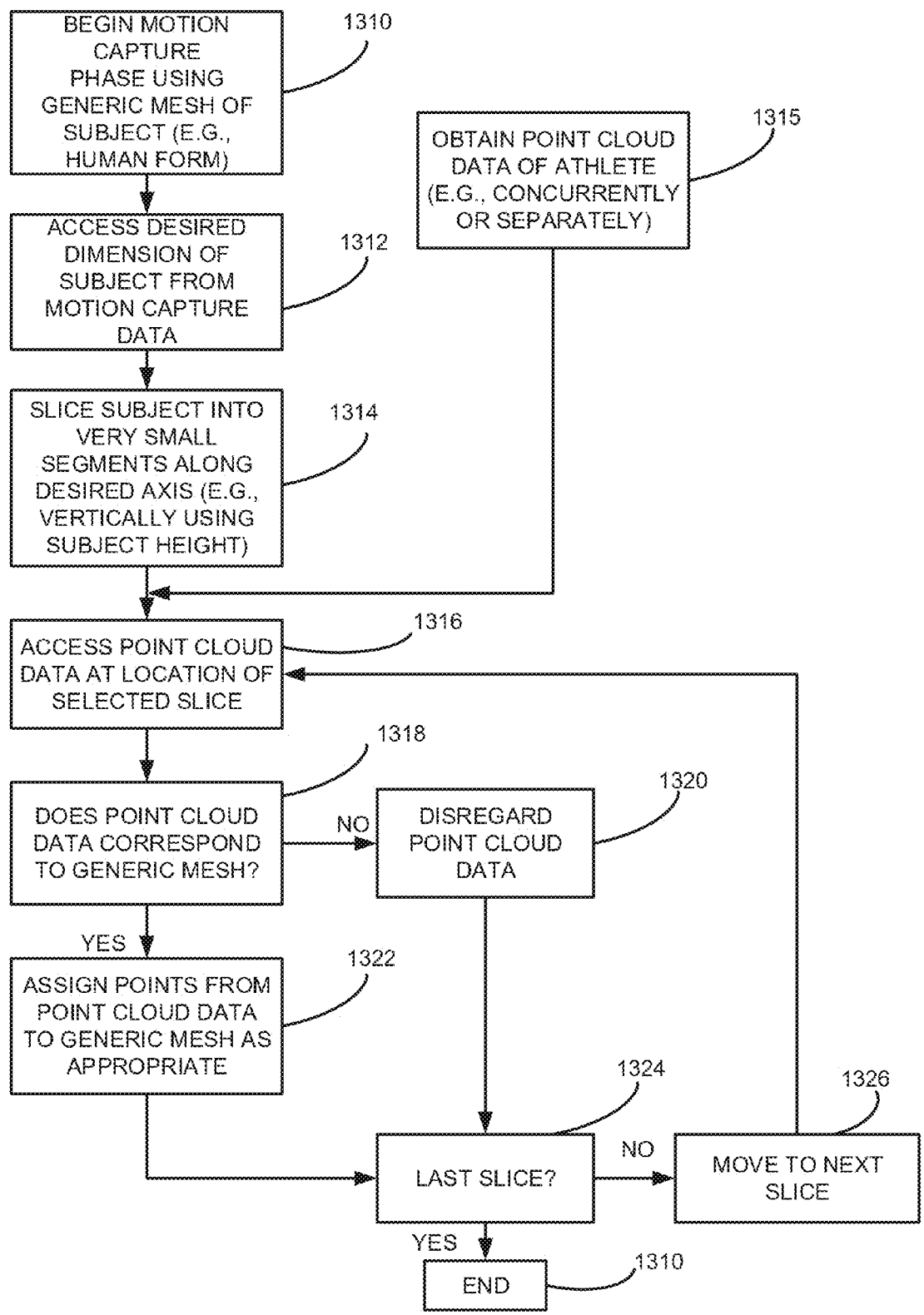
FIG. 12 is a flow chart showing steps of a representative method for developing a virtual testing model.

FIG. 12 is a flow chart of one representative method for developing a virtual model. In step 1310, a motion capture session is initiated, such as is described above in connection with FIGS. 5-7, using a generic 3D mesh of the subject. For example, a generic mesh of a human form can be used in cases where the subject is human. It should be noted that other types of subjects, such as objects (including clothing, equipment and other types of objects), can be subjected to motion capture and related modeling along the same lines.

In step 1312, a dimension of the subject is selected. For example, in the case of a human subject, the dimension can be the vertical dimension or the subject's height. This dimension then defines an axis used in subsequent steps. In step 1314, the subject is divided into segments (or "slices") along the axis from a base of the subject to the subject's outermost extent along the axis. Referring to FIG. 5 as one example, the subject's feet can be regarded as the base, and the axis can extend from the base in a vertical direction to a highest elevation of the generic 3D mesh. Each segment or slice can be about 0.1 mm to about 1.0 mm, and typically about 0.5 mm. Segments as thin as 0.01 mm are achievable with available high resolution motion capture cameras, but very long CFD processing times must then be addressed.

In step 1315, point cloud data of the human subject is obtained. As described elsewhere, such point cloud data is advantageously obtained concurrent with motion capture of the human subject. It is also possible in some situations, however, to use previously obtained point cloud data.

In step 1316, a routine is begun that calls for the point cloud data to be accessed at a position corresponding to a current slice or segment in the generic 3D mesh. For example, this routine can be assumed to start at the base and to move along the axis. In the example of FIG. 5, the first slice can be at the feet of the human subject. In step 1318, the routine checks if point cloud data exists for a given slice in the generic mesh. In addition, the program determines if the data is meaningful. If the point cloud data does correspond to the generic 3D mesh, i.e., if it is close enough to a predicted location on the generic mesh to suggest that it is valid data, then the generic mesh is modified ("pushed" or "pulled") so that its outer surface has the dimension of the point cloud data (step 1322). If there is no point cloud data for any particular slice or if the point cloud data is suspect (e.g., too far from the position predicted by the generic mesh), then the point cloud data is disregarded (step 1320) and the generic mesh data is retained for that slice. In step 1324, the routine checks to see if the last slice has been processed. If not, the process moves to the next slice (step 1326) and returns to step 1316. If the last slice has been processed, then the routine is ended. Even using slices or segments of 0.5 mm, the process can be completed in seconds or minutes for most typical scenarios.

As a result, the completed virtual model is specific to the human subject and has the dimensions provided by the point cloud data at appropriate locations, but also has reasonable dimensions provided by the generic mesh in areas where the point cloud data may have been deficient, and thus does not have any holes. Such holes in the resulting data would require time-consuming and difficult modification through manual operations.

The modeling of the human subject is typically supplemented with submodels representing clothing worn by the human subject or equipment used by the subject during the modeled activity. For cycling as one example, submodels can represent the subject's position on the bicycle, the bicycle, the subject's clothing and/or the subject's helmet. In this way, changes to any of these attributes can be measured, e.g., to determine a change in aerodynamic drag. New configurations, such as the same subject but with a different helmet or different bicycle can be relatively quickly simulated without the high cost and delay of actual wind tunnel testing. In addition to simulated aerodynamic testing, the virtual model in conjunction with one or more equipment or clothing submodels can be used to evaluate fit and interoperability of the equipment and/or clothing with the human subject.

Figure 13:
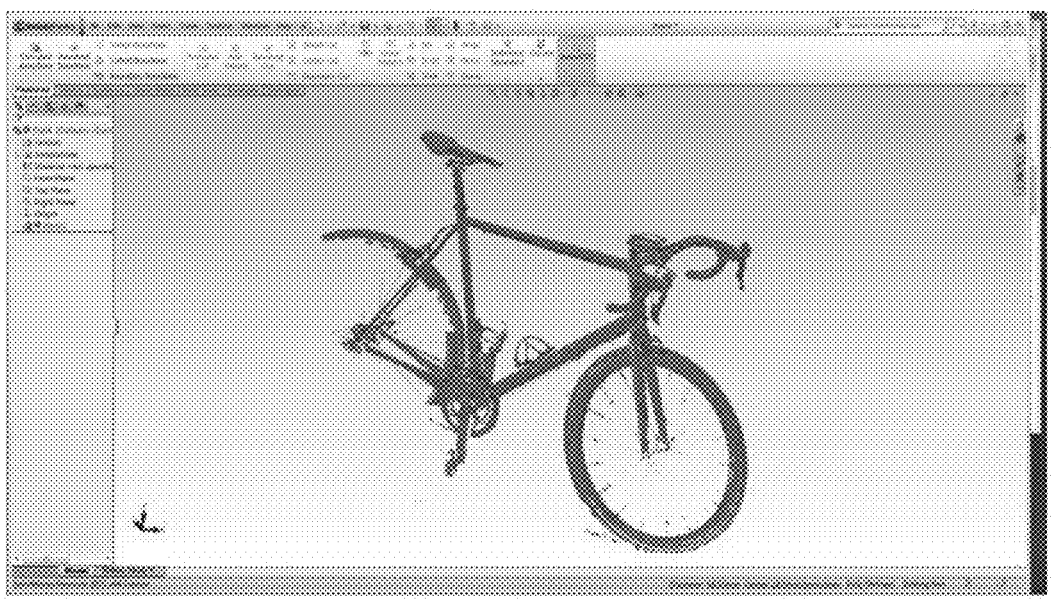
FIG. 13 is a screen shot showing a representative image scan of a bicycle.
Figure 14:
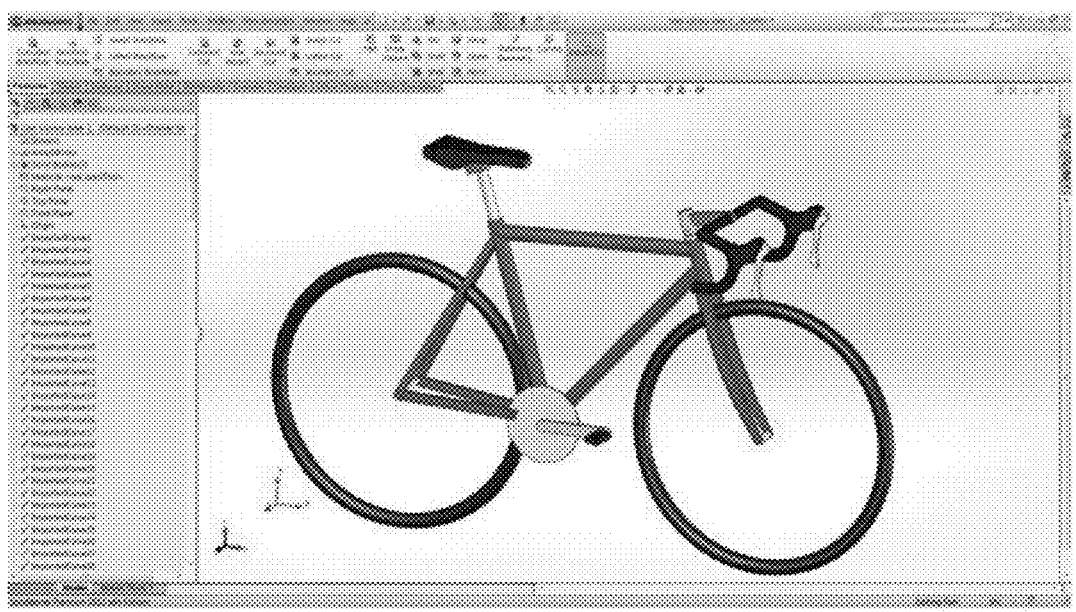
FIG. 14 is a screen shot showing a model of the bicycle of FIG. 12 as developed for aerodynamic testing.
Figure 15:
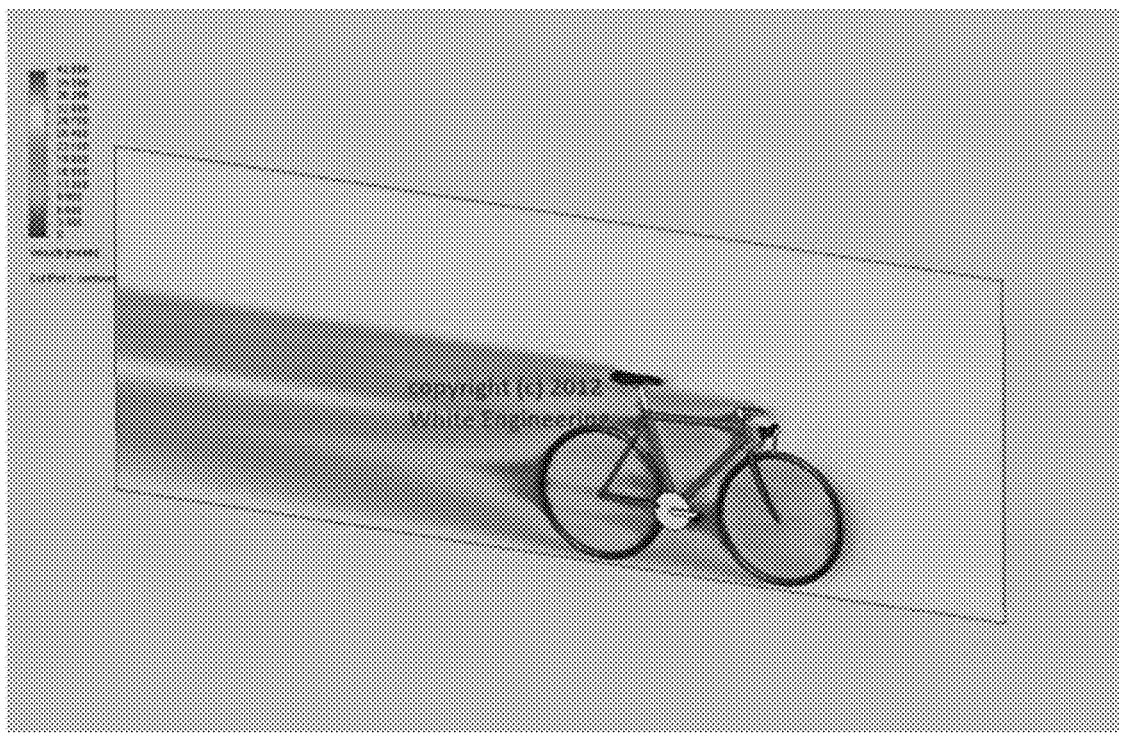
FIG. 15 is a screen shot of the model of the bicycle of FIG. 13 undergoing aerodynamic testing using computational fluid dynamics.
Figure 16:
FIG. 16 is a front elevation view of a human subject in a T pose and wearing instrumentation for generating desired position data.
Figure 17:
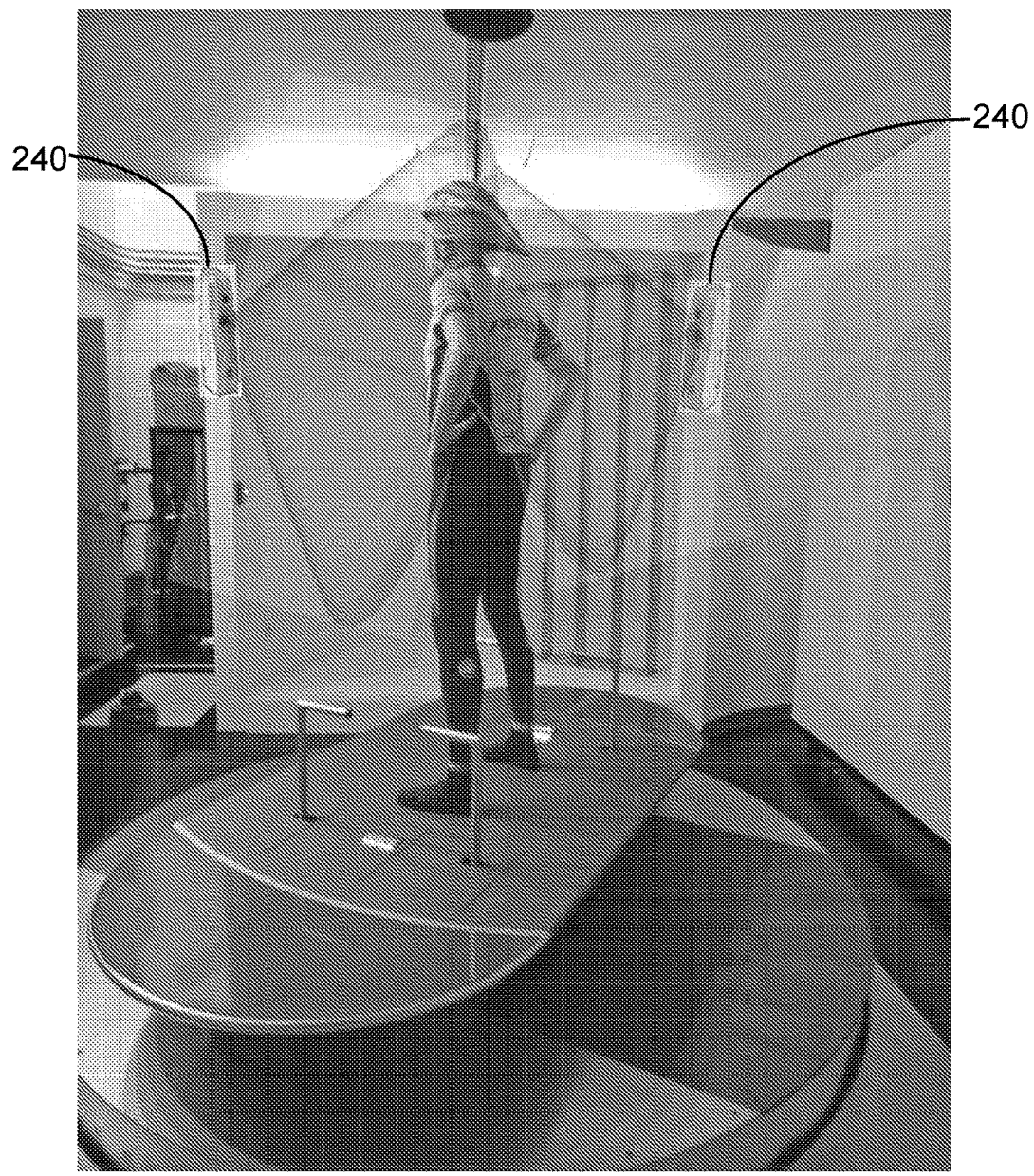
FIG. 17 is an elevation view of a human subject in a standing position and wearing a helmet during an image scanning operation.

Described below are additional drawing figures. FIG. 13 is a screen display showing a representative image scan of a bicycle. FIG. 14 is a corresponding model of the bicycle of FIG. 13 developed for aerodynamic testing. It can be seen that some of the bicycle components, such as the wheels, the frame and the crankset, as just three examples, are simplified in the model of FIG. 14 as compared to the imaged bicycle of FIG. 13. FIG. 15 is a screen display of the bicycle model of FIG. 14 during testing with representations of the magnitude and direction of drag forces. FIG. 16 illustrates a human subject in the T pose position and with markers at selected reference points. FIG. 17 illustrates a human subject in a standing position undergoing imaging of his outer surface, such as by two stereo cameras. FIG. 18 illustrates the human subject riding a bicycle in place on a test stand to allow the dynamics of the rotating wheels and crankset, as well as the subject's moving legs and other motion, to be modeled.

Figure 19:
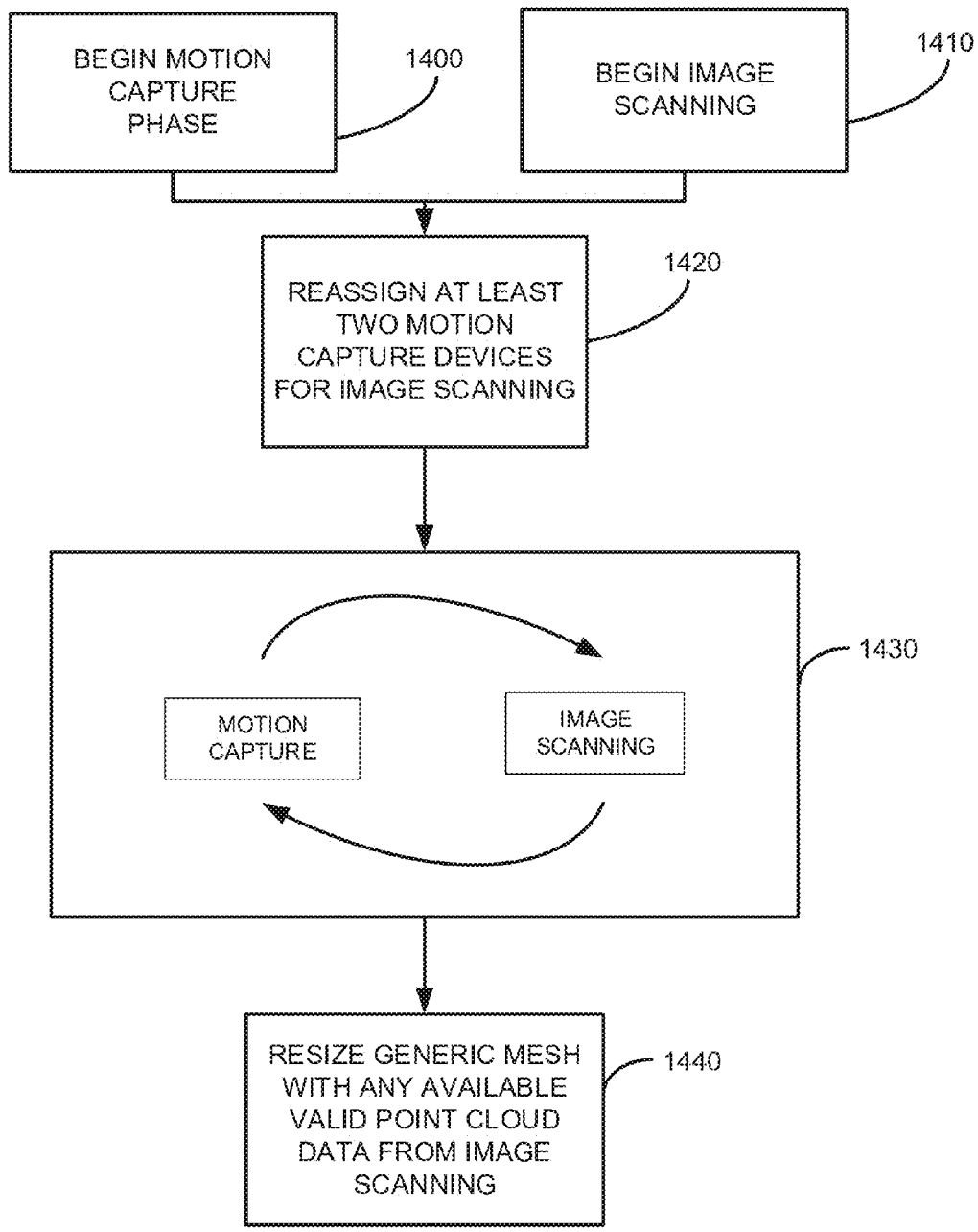
FIG. 19 is a flow chart of a method of conducting image scanning concurrent with the motion phase.

FIG. 19 is a flow chart of a method in which image scanning occurs concurrent with the motion capture phase. In step 1400, the motion capture phase as described above is initiated. At about the same time, and in parallel with the motion capture phase, imaging scanning of the subject is also initiated. According to one embodiment, there are multiple motion capture cameras or other devices arranged in a scene to capture the motion of one or more subjects. By reassigning at least two of the cameras/devices for image scanning (step 1420), such as by configuring cameras in a video mode, then image scanning can be conducted concurrent with the motion capture phase. The two cameras/devices designated for scanning should be arranged relative to each other to develop an appropriate scanned image of the subject. In step 1430, motion capture of the subject is being conducted in parallel with image scanning of the subject. For example, there is a time stamp associated with each capture device (e.g., stereo camera, Artec EVA, LASER scanner or other such device) that allows the various frames to be handled digitally and synchronized as desired. If devices have different capture rates, then the rate of the slowest device is selected to control the building of the mesh and the faster devices are averaged to the rate of the slowest device or intermediate frames on the faster devices are simply dropped, thereby maintaining the devices in synchronization with each other. Alternately the devices may be gen locked by the central computer or chip such that all devices fire at a designated rate, thus assuring parallel processing. As described above, in step 1440, any available point cloud data that is valid is assigned to the generic mesh to allow it to be resized and made more accurate relative to the human subject.

Among the benefits of the described approaches are the following: (1) the human subject's motion can be captured—and an image scan of his outer surface can be completed—in a single sequence of motion without breaks using one or more articles of equipment (e.g., bicycle, helmet, skinsuit, etc.) for accurate modelling; (2) the human subject's small movements during the motion capture phase do not cause errors in modelling because the in above approaches the overall mesh is always defined, and thus defined surface movement is recognized as a 3D translation of the surface and not noise; (3) the image scan of the 3D surface can be prepared concurrent with the motion capture phase, so there is no lengthy delay in deriving a stitched together image; and (4) the virtual model is complete because regions of the scanned image in which there holes or other discontinuities are not used (rather, the data from the generic 3D mesh is retained in these areas).

Figure 20A:
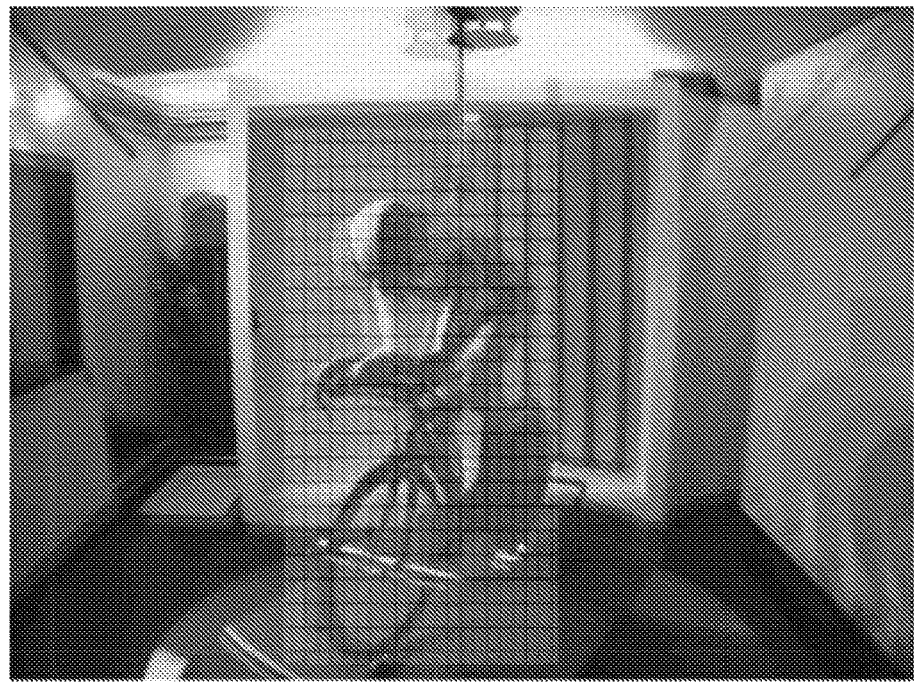
FIGS. 20A and 20B are elevation views from two different angles of a human subject on a bicycle with a superimposed grid to allow calculation of drag according to a new pixel mapping approach.
Figure 20B:
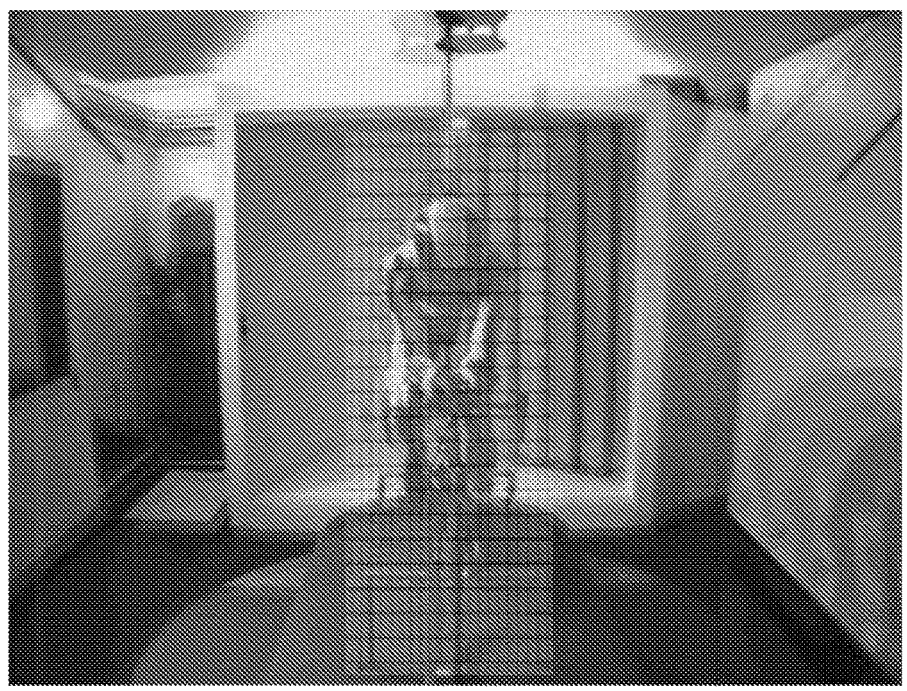

A related modeling approach as shown generally in FIGS. 20A and 20B is referred to as dynamic pixel mapping. FIGS. 20A and 20B show elevations of a human subject riding a bicycle and a superimposed grid pattern. Pixel mapping is a relatively crude approach to measuring drag that involves assigning each element of a cross section that faces the air flow with a similar weighting. Conventional pixel mapping assumes that each occupied pixel faces the air flow orthogonally, i.e., that the entire surface under consideration is flat, but at least for surfaces at the boundaries of a bicycle or a body, the occupied pixels are not oriented orthogonally Therefore, these boundary pixels should have a reduced weighting because they contribute less drag. By using stereo imaging technology, the weighting for pixels throughout a non-flat cross section can be measured more accurately, thereby allowing a more precise calculation of drag that accounts for boundary pixels.

Mapping the CFD elements incorporating differential drag grams to the stereo pixel map enables assigning every pixel of the stereo image a differential drag gram weight. This measure of drag weight in grams per pixel may then be used independent of the CFD analysis to calculate the drag weight in grams. The per pixel drag weight may also be summed to calculate the complete drag weight from the pixel map rapidly at the frame rate of the stereo vision motion capture imaging device to give dynamic drag grams. Rapid calculation of drag grams may be used to interpolate between CFD calculations that require lengthy computer computations, which further enhances a dynamic calculation.

In view of the many possible embodiments to which the disclosed principles may be applied, it should be recognized that the illustrated embodiments are only preferred examples and should not be taken as limiting in scope. Rather, the scope of protection is defined by the following claims. I therefore claim all that comes within the scope and spirit of these claims.

What is claimed is:

1. A method for developing a virtual testing model of a subject for use in simulated aerodynamic testing using one or more computers, comprising:
    using a computer to generate a simulation environment in which a generic 3D mesh of the subject is calculated;
    receiving an input via the computer identifying a dimension of the subject and at least one reference point on the subject;
    receiving an input via the computer of point cloud data developed from imaging the subject with an image scanner and representing at least the subject's outer surface in the simulation environment;
    using the computer to adapt the generic 3D mesh to the subject by modifying the generic 3D mesh to have a corresponding dimension and at least one corresponding reference point, the corresponding dimension being calculated or numerically sampled to correspond to the identified dimension of the subject and the at least one corresponding reference point being calculated or numerically sampled to correspond to the identified at least one reference point of the subject;
    using the computer to modify the generic 3D mesh further by applying at least a portion of the point cloud data from the imaged subject's outer surface at selected locations to scale the generic 3D mesh to have the subject's actual circumference at corresponding locations, thereby developing the virtual testing model specific to the subject and suitable for computational fluid dynamics analysis;
    receiving a computer input of motion capture data from a motion capture process of the subject and completed concurrent with the imaging of the subject with the image scanner; and
    mapping the virtual testing model and the imaging data together to develop a drag weight per pixel of the image for aerodynamic testing.

2. The method of claim 1, wherein the method comprises generating a stereo image of the subject.

3. The method of claim 1, wherein the point cloud data is developed from imaging the subject using at least one of laser scanning, stereo vision, and optical high resolution 3D scanning techniques.

4. The method of claim 1, wherein the subject is a human subject, the dimension of the subject is the human subject's height, and the at least one reference point is taken from a set of reference points establishing the human subject's limb lengths and elbow, knee and ankle positions.

5. The method of claim 1, wherein applying at least a portion of the point cloud data from the imaged subject's outer surface at selected locations to scale the generic 3D mesh comprises applying, with the computer, point cloud data representing the subject's actual lower leg circumference to a lower leg location in the generic 3D mesh.

6. The method of claim 1, wherein modifying the generic 3D mesh further by applying point cloud data occurs in real time.

7. The method of claim 1, wherein developing the virtual testing model specific to the subject occurs without filling holes and without resolving discontinuities present in the point cloud data representing the subject's outer surface.

8. The method of claim 1, wherein the subject is a human subject, the human subject is subjected to a motion capture session while emulating an activity, and wherein, concurrent with the motion capture session, the imaging of the subject is completed with the computer, thereby allowing the adapting of the generic 3D mesh to be completed in real time to develop the virtual testing model of the human subject in motion.

9. The method of claim 1, further comprising animating the virtual testing model with the computer based on motion capture data of the subject in motion and subjecting the animated virtual testing model to simulated aerodynamic testing.

10. The method of claim 9, wherein the subject is a human subject, further comprising supplementing the animated virtual testing model of the human subject with an accessory submodel for use by the computer, the accessory submodel representing at least one of an article of clothing worn by the human subject or an item of equipment used by the human subject.

11. The method of claim 10, wherein the accessory submodel comprises a submodel for a garment wearable by the human subject.

12. The method of claim 10, wherein the accessory submodel comprises a submodel for a helmet wearable by the human subject.

13. The method of claim 10, wherein the accessory submodel comprises a submodel for a bicycle to be ridden by the human subject.

14. The method of claim 10, further comprising displaying the animated virtual testing model, and dynamically evaluating changes to the human subject based on changes to the animated virtual testing model made via the computer.

15. A method for developing a virtual testing model of a human subject for use in simulated aerodynamic testing using one or more computers, comprising:
    using a computer to generate a simulation environment for a user in which a generic 3D mesh of the human subject is calculated;
    receiving a computer input identifying a height of the human subject and at least one reference point on the human subject;
    receiving a computer input of point cloud data developed from imaging the human subject with an image scanner;
    receiving a computer input of skeletal structure and joint locations;
    representing at least the human subject's outer surface to the user in the simulation environment;

using the computer to adapt the generic 3D mesh to the human subject by modifying the generic 3D mesh to have a corresponding height and at least one corresponding reference point, the corresponding height being calculated or numerically sampled to correspond to the identified height of the subject and the at least one corresponding reference point being calculated or numerically sampled to correspond to the identified at least one reference point of the subject;

using the computer to modify the generic 3D mesh further by applying at least a portion of the point cloud data from the imaged subject's outer surface at selected locations to scale the generic 3D mesh to correspond to the subject, wherein modifying the generic 3D mesh comprises iteratively:

correlating a thin segment of point cloud data defined to extend perpendicular to a desired axis with a corresponding location in the generic 3D mesh, identifying valid data points in the thin segment of point cloud data with two-coordinate references in a plane extending perpendicular to the desired axis, using the two-coordinate references of the valid data points to calculate a circumference among the valid data points within the thin segment, discarding all data points and retaining the calculated circumference, at the corresponding location in the generic 3D mesh, resizing the generic 3D mesh to have the calculated circumference, wherein if no valid point cloud data exists for any thin segment and a circumference cannot be calculated, then a generic circumference at the corresponding location in the generic 3D mesh is retained, wherein a resulting modified generic 3D mesh having calculated circumferences at corresponding locations more closely corresponds to the human subject's actual outer surface than the generic 3D mesh, the modified generic 3D mesh thereby defining a virtual testing model specific to the human subject that provides increased accuracy in simulated aerodynamic testing using computational fluid dynamics.

16. A method for developing a virtual testing model of a human subject in motion for use in simulated aerodynamic testing, comprising:

receiving an input via a computer of motion capture data of the human subject in motion in a motion capture session using a generic 3D mesh of the human subject;

concurrent with the motion capture session, using a computer to image at least a portion of the human subject with point cloud data of the human subject obtained from scanning the human subject with an image scanner;

substantially in real time, adapting the generic 3D mesh to match the human subject more closely at locations where valid point cloud data is present by correlating thin segments of the point cloud data along a desired axis to corresponding locations in the generic 3D mesh and applying valid point cloud data from the segments to selectively resize the generic mesh to more closely match the human subject, and if no valid point cloud data exists for a specific segment, then retaining dimensions of the generic mesh at a location corresponding to the specific segment; and displaying an image of the human subject in simulated aerodynamic testing showing a drag weight per pixel.

17. A non-transitory computer-readable storage medium storing a computer program product, the computer program product including instructions, the instructions when executed, instructing one or more processors to perform a method, the method comprising:

receiving an input via a computer of motion capture data of the human subject in motion in a motion capture session using a generic 3D mesh of the human subject;

concurrent with the motion capture session, using a computer to image at least a portion of the human subject with point cloud data of the human subject; and in real time, adapting the generic 3D mesh to match the human subject more closely by correlating thin segments of the point cloud data along a desired axis to corresponding locations in the generic 3D mesh and applying valid point cloud data from the segments to selectively resize the generic 3D mesh to more closely match the human subject at locations where valid point cloud data is present, and if no valid point cloud data exists for a specific segment, then retaining dimensions of the generic mesh at a location corresponding to the specific segment; and displaying an image of the human subject in simulated aerodynamic testing showing a drag weight per pixel.

18. The non-transitory computer readable storage medium of claim 17, wherein the simulated aerodynamic testing comprises computational fluid dynamics.

\* \* \* \* \*